Jan. 4, 1927.　　　　　　　　　　　　　　　1,613,466
L. E. LAWRENCE
ROTARY VALVE
Filed June 29, 1925　　　5 Sheets-Sheet 1

Inventor
Leland E. Lawrence
By Alexander & Powell
Attorneys

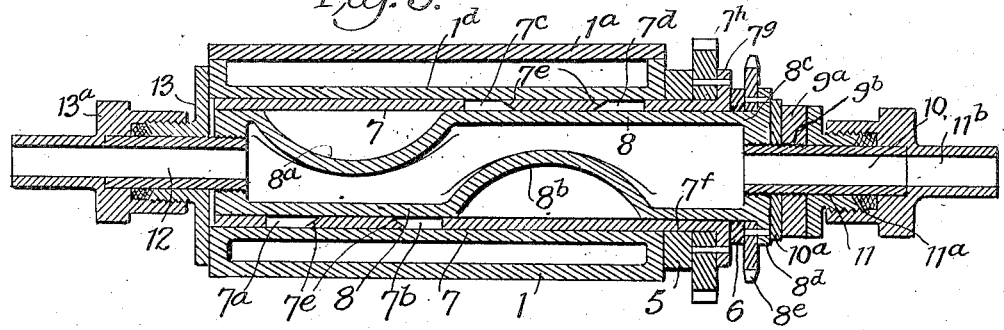
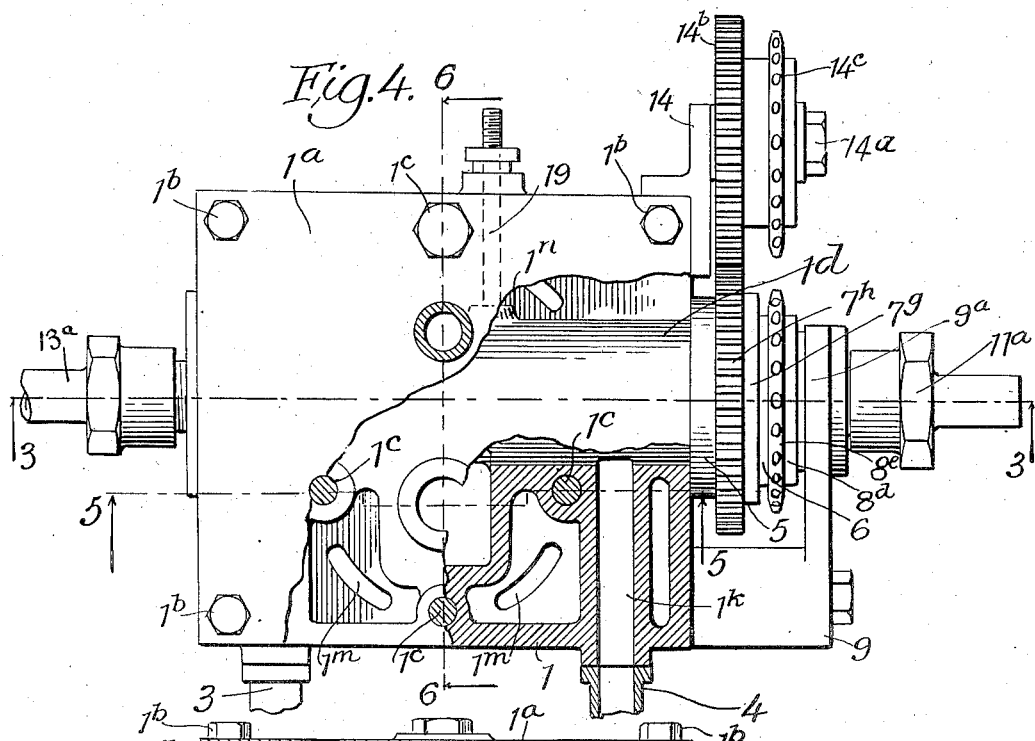
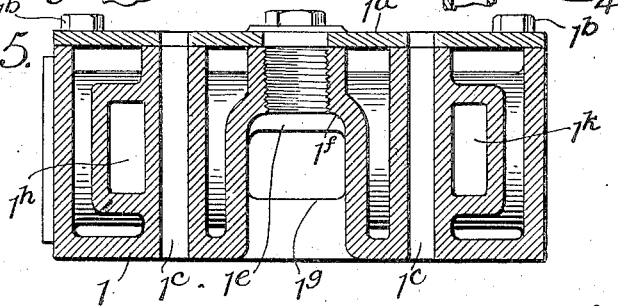

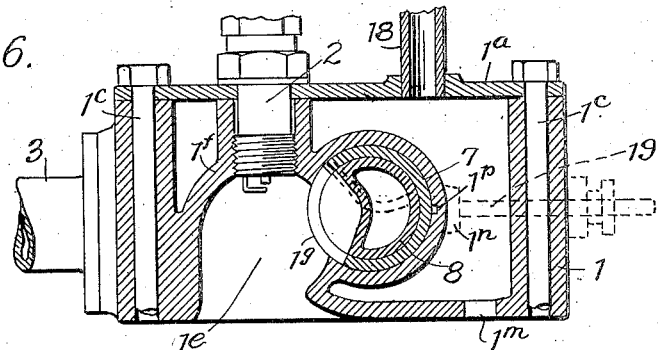
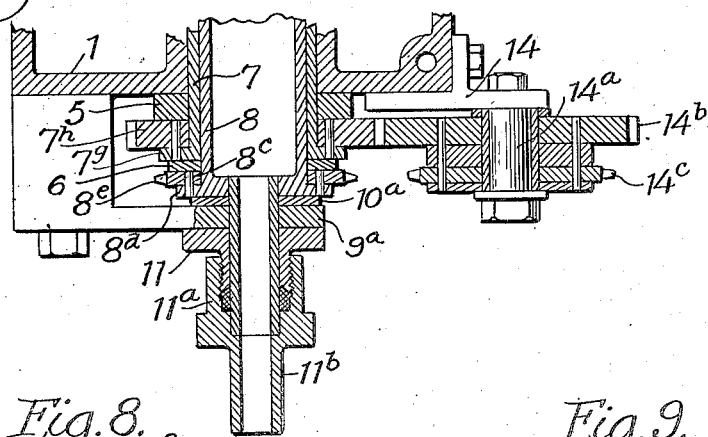
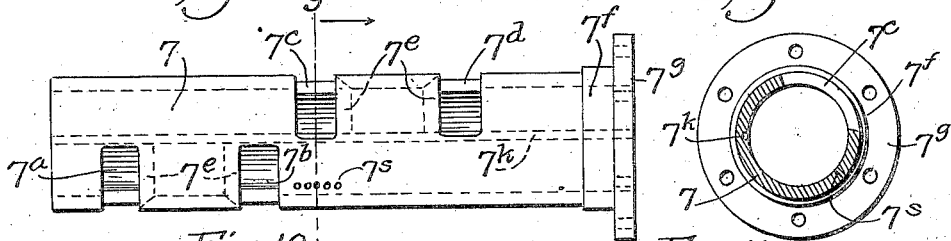
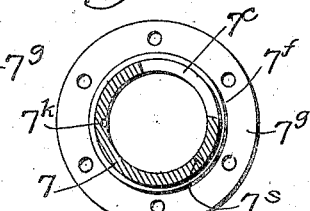
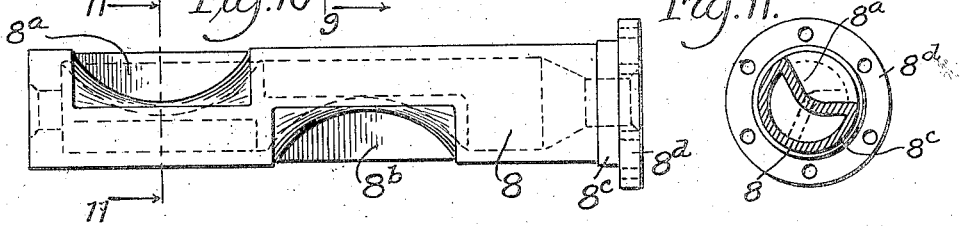
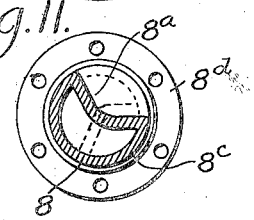

Jan. 4, 1927.　　　　L. E. LAWRENCE　　　　1,613,466
ROTARY VALVE
Filed June 29, 1925　　　5 Sheets-Sheet 4
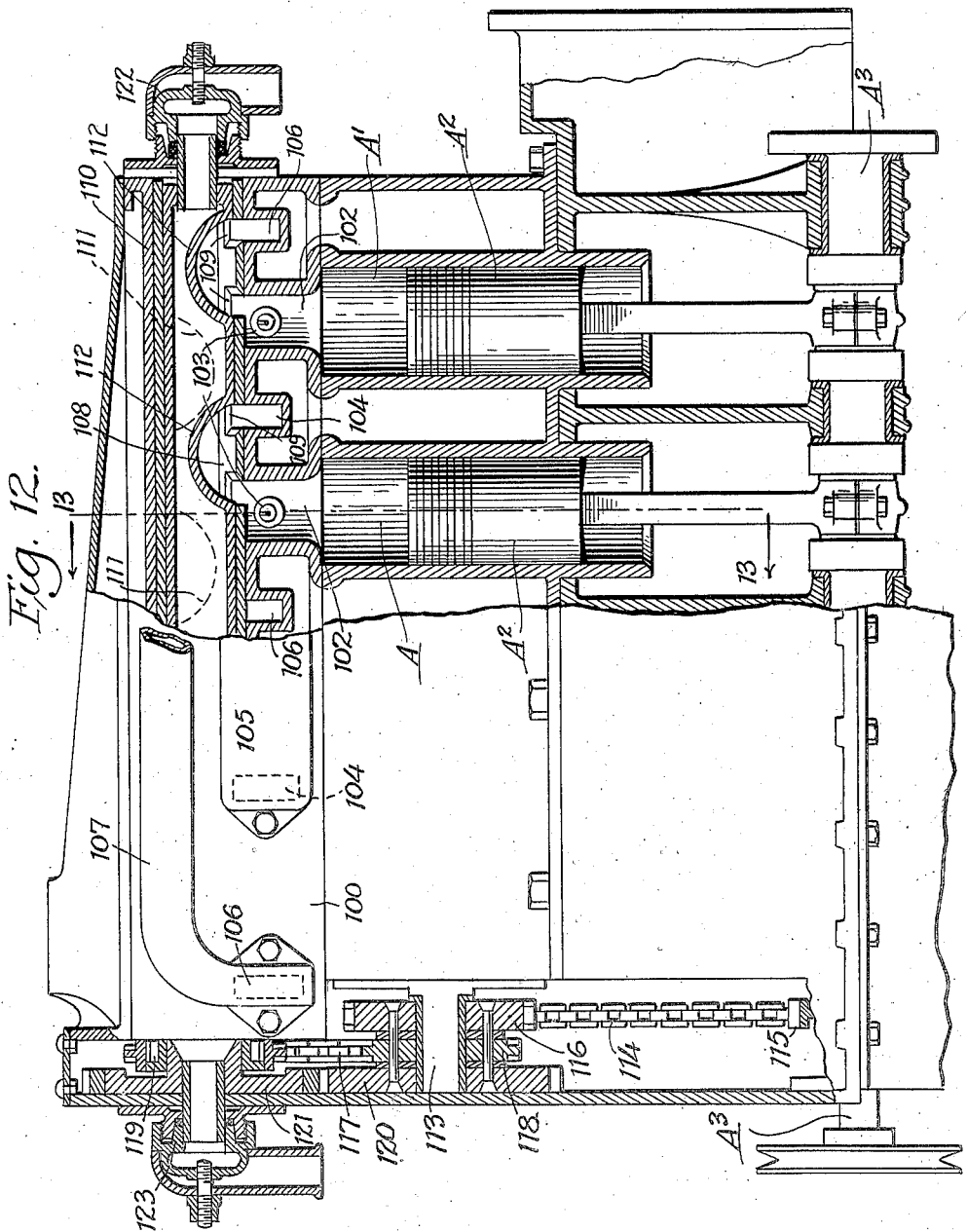

Jan. 4, 1927. 1,613,466
L. E. LAWRENCE
ROTARY VALVE
Filed June 29, 1925   5 Sheets-Sheet 5
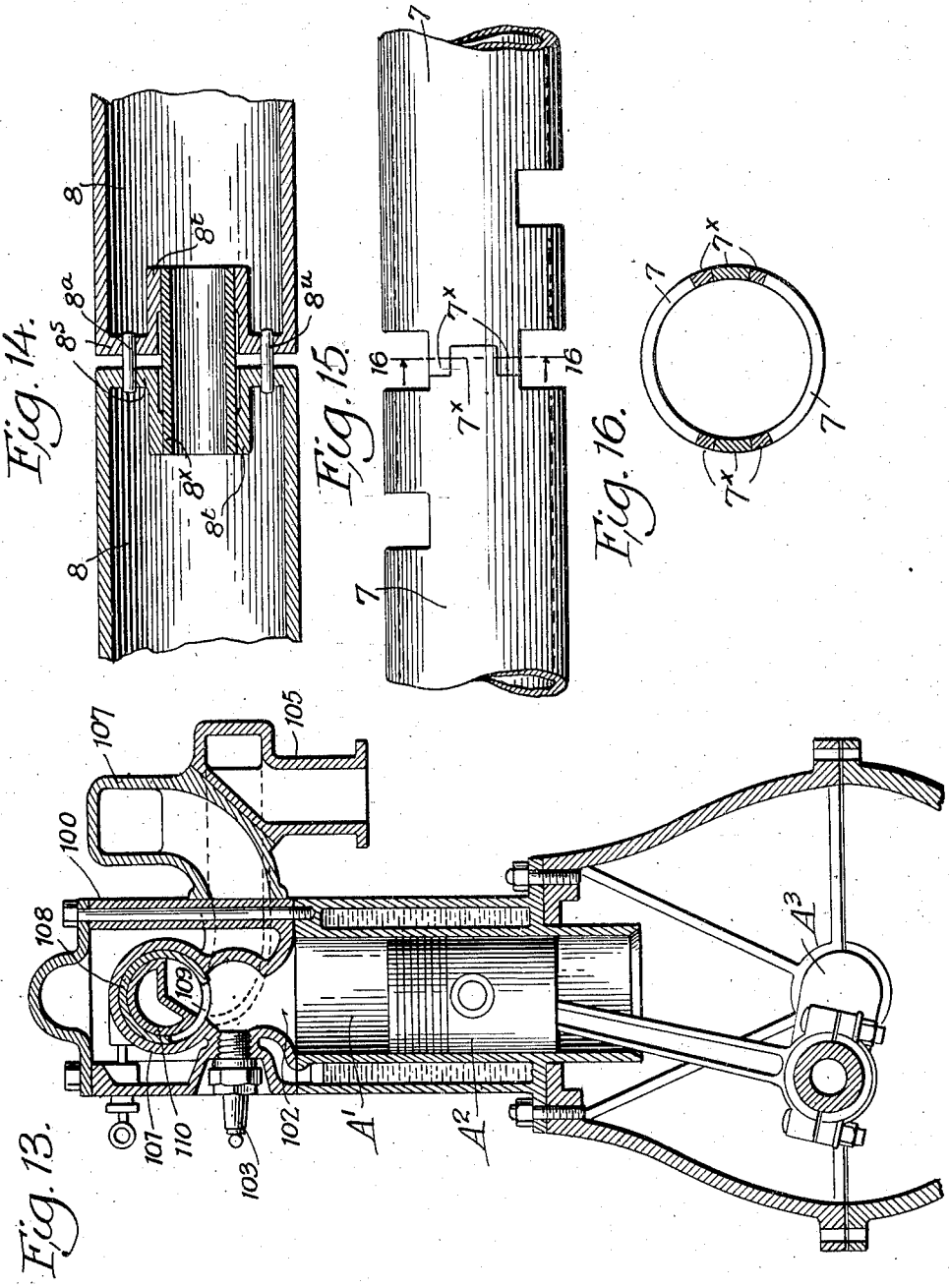
Inventor
Leland E. Lawrence
By
Alexander & Dowell
Attorneys Patented Jan. 4, 1927.

1,613,466

UNITED STATES PATENT OFFICE.

LELAND ELMER LAWRENCE, OF NEWCASTLE, INDIANA.

ROTARY VALVE.

Application filed June 29, 1925. Serial No. 40,373.

This invention is an improvement in rotary valves for internal combustion engines and the like, and the principal object of the invention is to provide a novel casing adapted to form the cylinder head of the engine, and housing therein a novel rotary valve and firing chamber, said valve governing the intake and exhaust of such engine, and embodying certain novel features pertaining to cooling and lubrication whereby a more efficient valve is obtained.

Other objects of my invention are to provide a novel valve casing having short passages therein for the intake and exhaust gases, said passages beginning and ending all on the same side of a rotating distributing valve member revolving within a ported sleeve rotating in the opposite direction in the valve casing; to pass part or all of the cooling water through the inner distrbuting member, then through the motor block and valve casing, in such manner as to maintain proper clearance between the inner distributing member and the rotating sleeve, and between the rotating sleeve and the valve casing as the engine heats up, or as the heat of the cylinders increases due to heavier loads; to provide a novel method of securing opposite directions of rotation of the inner and outer rotating valve members; to provide a combination rotary valve and firing chamber designed to give the compressed gases high turbulence; and to provide a novel lubrication system utilizing the compression of the engine cylinder to force oil through perforations in the outer rotating sleeve to the surface of the inner rotating distributing valve member.

Other minor objects of the invention will be hereinafter set forth.

I will explain the invention with reference to the accompanying drawings which illustrate one practical embodiment thereof to enable others to adopt and use the same, and will summarize in the claims the essentials of the invention, the novel features of construction, and novel combinations of parts, for all of which protection is desired.

In said drawings:

Fig. 3 is a longitudinal vertical section on the line 3—3, Fig. 4.

Fig. 4 is a top plan view, partly broken away, of the valve casing.

Fig. 5 is a longitudinal vertical section on the line 5—5, Fig. 4.

Fig. 6 is a transverse vertical section on the line 6—6, Fig. 4.

Fig. 7 is a horizontal section on the line 7—7, Fig. 2.

Fig. 8 is a view of the outer valve sleeve.

Fig. 9 is a section on the line 9—9, Fig. 8.

Fig. 10 is a view of the inner valve sleeve.

Fig. 11 is a section on the line 11—11, Fig. 10.

Fig. 12 is a longitudinal view, partly in section, showing my invention applied to a multiple unit engine.

Fig. 13 is a transverse section on the line 13—13, Fig. 12.

Fig. 14 is a view showing a means for sectionalizing the inner valve sleeve.

Fig. 15 is a view showing a means for sectionalizing the outer valve sleeve.

Fig. 16 is a section on the line 16—16, Fig. 15.

Figure 1:
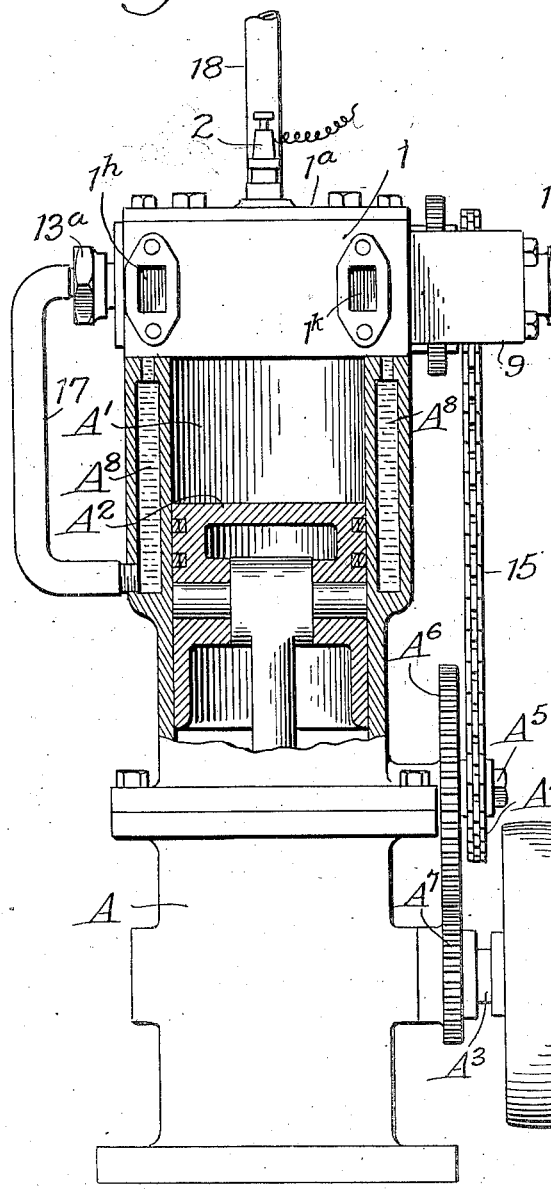
Fig. 1 is a side elevation, partly in section, of an internal combustion engine, showing my novel combined rotary valve and firing chamber applied thereto.

As shown in the drawings, my novel rotary valve is particularly adapted to be used with an internal combustion engine A having a cylinder A' in which a piston $A^2$ is reciprocably driven from a crank shaft $A^3$ in the usual manner.

The upper end of the cylinder A' is open and the casing 1 forms the head of the cylinder A' as shown in the drawings, said casing being preferably rectangular in shape, and comprising a hollow casting closed on its bottom, sides, and ends, but open at its top. A cover plate $1^a$ is removably secured to the top of the casing 1, preferably by means of bolts $1^b$ passing through perforated lugs in the four corners of the casing 1. The casing is preferably removably bolted to the upper end of the cylinder A' to form the cylinder head by means of bolts $1^c$ as shown, passing through suitable bores in casing 1 and cover $1^a$ and engaging the upper end of the cylinder A' in the usual manner.

Within the casing 1 extending longitudinally therethrough is an integral tubular portion 1ᵈ adapted to receive the rotary valve sleeves 7 and 8 (hereinafter referred to), the ends of the casing 1 in way of the tubular portion 1ᵈ being cut away.

Extending upwardly into the casing 1 opposite the cylinder A' is a firing chamber 1ᵉ, opening at its bottom into the cylinder A', but closed at its top, as at 1ᶠ. Firing chamber 1ᵉ is substantially cylindrical in shape, the outlet thereof being restricted as shown in Fig. 6 to give the gases a high turbulence or whirling motion while being compressed and while expanding on the firing stroke, causing efficient burning. Extending down through the cover 1ᵃ, casing 1, and the top 1ᶠ of the firing chamber 1ᵉ is a spark plug 2 as shown in Fig. 6, said spark plug 2 being electrically connected in the usual manner to a distributor (not shown) to ignite the charge in the firing chamber 1ᵉ at the proper intervals. Firing chamber 1ᵉ has a port 1ᵍ in its side communicating with the tubular portion 1ᵈ, whereby access from the cylinder A' to the tubular portion 1ᵈ of the valve casing is obtained.

To one side of the firing chamber 1ᵉ, is an intake port 1ʰ extending through the side of the casing 1 and communicating with the tubular portion 1ᵈ, and on the opposite side of the firing chamber 1ᵉ from the intake port 1ʰ, is an exhaust port 1ᵏ likewise extending from the side of the casing 1 and communicating with the tubular portion 1ᵈ, firing chamber 1ᵉ and ports 1ʰ and 1ᵏ being all disposed on the same side of the tubular portion 1ᵈ, with the firing chamber interposed between the ports 1ʰ, 1ᵏ. Intake port 1ʰ registers with an intake manifold 3 supplying carbureted fuel vapors from a carburetor (not shown) or other source of fuel supply. Exhaust port 1ᵏ registers with an exhaust manifold 4 connected with a muffler (not shown) in the usual manner or discharging into the atmosphere.

Rotatably mounted within the tubular portion 1ᵈ of the casing is a sleeve 7 extending the full length of said casing and having pairs of circumferential slots 7ᵃ, 7ᵇ, and 7ᶜ, 7ᵈ, therein of suitable dimensions. The pair of intake slots 7ᵃ and 7ᵇ are located respectively one opposite the intake port 1ʰ, and the other opposite the half of the firing chamber port 1ᵍ adjacent the intake port 1ʰ. The pair of exhaust ports 7ᶜ, 7ᵈ, are located respectively, one opposite the exhaust port 1ᵏ and the other opposite the half of the firing chamber port 1ᵍ adjacent the intake port 1ʰ. Preferably the adjacent edges of the intake slots 7ᵃ, 7ᵇ, and of the exhaust slots 7ᶜ, 7ᵈ are internally beveled as at 7ᵉ to allow for a free passage of the gases therethrough. Both ends of sleeve 7 are open, but one end 7ᶠ is adapted to extend through the end of casing 1, and is provided on its outer end with a perforated annular flange 7ᵍ to which is secured a gear wheel 7ʰ. A suitable washer 5 is preferably interposed between the casing 1 and the gear 7ʰ around the sleeve 7.

Within the slotted sleeve 7 is an inner rotatable sleeve 8 which is preferably hollow and slightly longer than sleeve 7. In the walls of sleeve 8 are two recesses 8ᵃ, 8ᵇ, the intake recess 8ᵃ extending from a point opposite the outer edge of slot 7ᵃ in sleeve 7 to a point opposite the outer edge of slot 7ᵇ whereby when slots 7ᵃ, 7ᵇ, and recess 8ᵃ register a passage from intake port 1ʰ to the firing chamber 1ᵉ will be established. The exhaust recess 8ᵇ of sleeve 8 similarly embraces the slots 7ᶜ, 7ᵈ of sleeve 7. Preferably I provide two separate ports 7ᵇ, 7ᶜ, in the outer sleeve 7 adapted to register with the firing chamber port 1ᵍ, instead of a single port as has been heretofore done, for the following reasons. Assuming the case of a single unit engine having one common port in the outer sleeve registering with the firing chamber port, the exhaust and intake pockets in the inner sleeve would necessarily be connected, making one long pocket. As soon as the common port was opened for the exhaust stroke, the flame would ignite such fresh charge as would be left in the pocket from the previous intake stroke, creating a back pressure at the beginning of the exhaust stroke, and thereby lowering the power output. Also the fresh charge in the pocket would be wasted because the exhaust port would be open, and the burning charge would be discharged without doing any work. Then, on the intake stroke, immediately following the exhaust stroke, the piston would draw into the cylinder the dead or spent gas in the pocket before any fresh charge could enter the firing chamber, the dead gas occupying space which should be filled with a fresh charge, causing slow ignition and low pressure on the piston, and a consequent loss of power. Moreover, timing would not occur at the cylinder port, as it should, but would occur at the extreme ends of the pocket. In the case of a multi-unit engine using one common port in the outer sleeve to register with the single firing chamber ports, the same condition would hold as above described in connection with the single unit engine, except that proper timing of such engine would be impossible to attain, because each intake port would feed two adjacent cylinders and the center exhaust port would exhaust two adjacent cylinders. To accomplish this the outer sleeve is cut away enough to allow two successive intakes, and thus timing at the end of the pockets farthest from the cylinder is impossible, and hence timing at the cylinder port is impossible, and the engine could not properly function. Were the engine turned over by external power the cylinder would draw exhaust gas from the exhaust manifold at the same time the fresh charge was drawn in. Assuming the charge was fired, when the exhaust opened the flame would ignite the gas in the entire intake manifold.

But by using my design in which two separate ports register with the firing chamber port, all timing is done at the firing chamber port and all events are positively controlled. When the exhaust opens the intake is entirely closed, thus preventing ignition of the fresh charge in the intake pocket. Nor can the dead exhaust gas be sucked back into the cylinder on the intake stroke for the exhaust port is entirely closed before the intake port opens, and the intake pocket contains only fresh charge. Under these conditions the engine can develop full power, with maximum economy of fuel, for there will be no fresh charge burned at the beginning of each exhaust stroke, nor will the fresh charge be diluted by dead exhaust gas sucked back into the cylinder on the intake stroke. These advantages can be obtained only by using two separate ports in the outer sleeve adapted to register with the firing chamber port, one controlling the intake, and the other the exhaust. By using two separate ports adapted to register with the firing chamber port, as in my design, all events are turned at the cylinder port, independently, and there can be none of the troubles attendant on prior designs above described. As shown in Figs. 10 and 11 the recesses $8^a$, $8^b$ are preferably concavo-convex, the longitudinal section through the center thereof being substantially arcuate, and the transverse section through the recess at its mid point, as shown in Fig. 11 being approximately a 110° sector of a circle, the transverse sections from the mid point of the recess to either end thereof changing progressively from a 110° sector to a 110° arc of a cricle. The peculiar shape thus given the recesses $8^a$, $8^b$, provides a free unobstructed passage through the sleeves when the intake and exhaust slots of sleeve 7 register with the recesses in sleeve 8 by reason of the fact that the recesses $8^a$, $8^b$ are arcuate in longitudinal section. The shape of the gas passage cross section has nothing to do with the rapid opening and closing of the valve, nor the period over which the valve remains wide open, commonly known as dwell. The rapid opening and closing depends solely upon the diameter of the rotating members and the rotation in opposite directions. The dwell, or wide open period depends solely upon the relative valve angle subtended by the port in the firing chamber as compared to the angle included between the opening and closing sides of the ports in either sleeve. The shape of cross section shown is desirable from the manufacturer's point of view but is not essential to the success of the valve.

Sleeve 8 extends beyond the flange $7^c$ of sleeve 7, as at $8^c$, beyond the end of sleeve 7, and is provided at its end with an annular flange $8^d$ to which is secured a chain sprocket $8^e$.

Upon the end $8^c$ of sleeve 8, interposed between the chain sprocket $8^e$ and the adjacent end $7^g$ of sleeve 7 is a spacing washer 6 of suitable dimensions and material.

A suitable bracket 9 is bolted to the end of casing 1 adjacent the end $8^c$ of sleeve 8, said bracket 9 having a portion $9^a$ crossing the axis of sleeves 7 and 8, said portion $9^a$ having a bore $9^b$ therein as hereinafter described. A tubular extension 10 extends through bore $9^b$ and is preferably screwed into the adjacent end of sleeve 8 so as to rotate therewith. A washer $10^a$ is preferably interposed between the end of sleeve 8 and the bracket $9^a$. Secured to the bracket $9^a$ is a stuffing box member 11 into which the extension 10 projects, and a stuffing box member $11^a$ having a bore $11^b$ forming an extension of member 10, fits around the end of extension 10, and engages the member 11. Suitable packing may be interposed between the stuffing box members 11 and $11^a$, whereby extension member 10 may rotate freely within the member $11^a$, member 10 making a ground fit within the stuffing box member $11^a$, which member $11^a$ may be connected in any suitable manner with a source of water supply.

Similarly, an extension member 12 is screwed into the opposite end of sleeve 8 and engages stuffing box members 13 and $13^a$ similar to members 11 and $11^a$.

Bolted to the casing 1 is a bracket 14 having a stubshaft $14^a$ extending therefrom parallel to the sleeves 7 and 8. Shaft $14^a$ carries a gear $14^b$ of same size and meshing with the gear $7^h$ on sleeve 7, whereby sleeve 7 and shaft $14^a$ are caused to rotate in opposite directions and at the same speeds. Shaft $14^a$ also carries a sprocket $14^c$ and disposed opposite the sprocket $8^e$ of sleeve 8, sprockets $14^c$ and $8^e$ being of same size. Gear and sprocket $14^b$ and $14^c$ are fastened rigidly together, but are not keyed to the stationary stub shaft $14^a$. Both $14^b$ and $14^c$ are pressed on a bushing which rotates freely upon stub shaft $14^a$. A roller chain 15 runs over sprockets $8^e$ and $14^c$ and under a sprocket $A^4$ of same size as sprockets $8^e$, $14^c$, mounted on a counter shaft $A^5$ rotating through suitable gearing $A^6$, $A^7$ at half the speed of the engine crank shaft. By the above construction sleeves 7 and 8 each rotate at half the crank shaft speed, but in opposite directions.

Cooling of the valve casing is effected by means of slots $1^m$ in the bottom of the casing 1 adapted to register with the openings in the top of the water cooling ducts of the cylinder A', whereby the cooling water will circulate from the cylinder block within the casing 1 and around the intake and exhaust ports, $1^h$, $1^k$, the firing chamber $1^e$, and the tubular sleeve housing $1^d$, to cool the same.

Cooling water is also passed axially through the inner sleeve 8, the water entering the member $11^a$ through a pipe 16 connected to a source of water supply, such as a water main or the radiator (not shown) of an automobile. The cooling water passes through the extension member 10, the inner sleeve 8, from the exhaust end to the intake end of the sleeve 8, and out through extension 12 and member $13^a$ from whence it passes through a pipe 17 into the cooling ducts $A^s$ of the engine cylinder A', the water passing from thence up through slots $1^m$ into the valve casing 1 and out through a pipe 18 to the radiator (not shown) or other cooling receptacle. This system of circulation wherein the water is passed first through the inner sleeve 8 and then through the valve casing 1 around the tubular portion causes greater expansion of the casing 1 than of the valve 8, thus automatically providing proper clearances for the sleeves 7 and 8 within the tubular portion $1^d$ at high engine speeds, and heavy loads due to the presence of the colder water inside the valve 8 and the hotter water outside of the tubular portion $1^d$ of the casing 1, and hence causing relative freedom of the parts. By keeping the valves 7 and 8 cool throughout, warping is eliminated or maintained to a negligible degree, and water cooling of the casing places the only valve surface exposed to the heat of combustion between two water cooled surfaces, thus facilitating rapid heat dissipation.

The outer sleeve 7 is designed to completely close the firing chamber $1^e$ during the latter part of the compression stroke and the first part of the firing stroke, also the inner sleeve 8 is in a similar position thus making a double seal between high and low pressure along the circumference of the valve.

A ground fit between the outer sleeve 7 and the tubular casing $1^d$ holds the lubricating oil film to a thickness of about .001 inch for the entire valve length. Compression is held lengthwise of the valve by a section of this oil film equal to the width of the port, and of length equal to the distance between the port and the manifolds, giving good results and negligible valve leakage. Lubricating oil is supplied to lubricate outer sleeve 7 from the tubular casing $1^d$ preferably from an oil cup, or pump (not shown) through a pipe 19 entering a bore $1^n$ communicating with the tubular portion $1^d$ opposite the firing chamber $1^e$. An oil groove $1^p$ extends longitudinally of the portion $1^d$, passing the inner end of pipe 19, and distributes the oil longitudinally of the sleeve 7.

Lubrication of the inner sleeve 8 is accomplished by utilizing the compression in the firing chamber $1^e$ to force lubricating oil through perforations in the outer sleeve 7 to the inner sleeve 8. A series of holes or perforations $7^s$ extend diametrically through the outer sleeve 7 opposite the exhaust slot $7^c$ therein, and in such position that they appear in the firing chamber port $1^g$ at the beginning of the compression stroke and disappear therefrom just before firing occurs. Holes $7^s$ are made small enough so as to each be covered by a thin film of oil deposited on each revolution thereon while moving past the well oiled casing surface. On being exposed to the compression pressure the films of oil are driven through perforations $7^s$ in the outer sleeve 7 and deposited on the surface of the inner sleeve 8; each succeeding revolution depositing a film of oil under high pressure, causes the spreading of oil lengthwise of the valve, and thus the entire inner sleeve 8 is automatically lubricated. An oil groove $7^k$ is preferably provided extending longitudinally within the sleeve 7 to aid in spreading the oil over the entire surface of the inner sleeve 8.

The position of the sleeve valves 7 and 8 with respect to the cylinder A and firing chamber $1^e$ may be varied without changing the fundamental design or operation thereof and I do not limit my invention to the exact form shown in the drawings.

My invention provides a valve casing having short gas passages in the valve casing beginning and ending on the same side of the inner rotating sleeve 8, said sleeve revolving inside an outer revolving sleeve 7 having ports therein, the two said sleeves rotating in opposite directions, within the stationary casing. The cooling water is first passed through the inner rotating sleeve 8 from the exhaust end to the intake end, then through the motor block $A^s$ and casing 1 so as to maintain proper clearance between the inner rotating sleeve 8 and the outer rotating sleeve 7, and between the outer rotating sleeve 7 and the stationary casing 1.

Instead of using only one side of the casing 1 for the intake and exhaust ports $1^h$, $1^k$, both sides of the casing may be used whereby double use of the pair of gas passageways in the inner and in the outer sleeves may be had, the slots and recesses in the sleeves 7 and 8 registering twice for each revolution.

My novel means for rotating the valve sleeves 7 and 8 effects opposite directions of rotation thereof, giving quick opening and closing of the ports. Instead of using a single chain, two chains may be used, one chain driving one sleeve at one end of the casing, and the other chain driving the other sleeve from the opposite end.

Multiple ports may be used in my valve so as to allow the sleeves to be rotated at different fractions of the crankshaft speed, depending upon the number of ports in the rotating sleeves.

My rotary valve and combined firing chamber are designed to give the compressed gases high turbulence, and the compression of the engine is used to force lubricating oil through the rotating outer sleeve to the surface of the inner sleeve.

The rotating sleeves may be sectionalized into two or more parts so as to facilitate manufacture and to further eliminate warping and expansion troubles that would be present in a relatively long rigid sleeve. The sections would be suitably connected together and such construction would furthermore tend to relieve stresses and strains resulting from unequal expansions or warping of the parts of the valve. The method of sectionalizing the inner valve sleeve 8, as shown in Fig. 14, would reduce the bending moment thereof permitting same to fit itself into the outer sleeve 7 without undue strains, and the small flexures which would accompany warping would fall within the elastic limit of the material of the sleeve and eliminate breakage. In Fig. 14 the sleeve 8 comprises a plurality of aligned sections, the ends thereof being closed, as at $8^s$, and having internal annular flanges $8^t$ extending axially of the ends $8^s$. Exterior to flanges $8^t$ are series of pins $8^u$ which make a press fit in the end $8^s$ of one section, the pins $8^u$ making a sliding fit in perforations in the end $8^s$ of the adjacent section whereby the sections are caused to rotate in unison. Extending through the adjacent annular flanges $8^t$ is a sleeve $8^x$ making a tight fit therein and connecting the adjacent ends of the sections together, while permitting the cooling water to pass therethrough as previously described.

The outer sleeve 7, as shown in Figs. 15 and 16 may be sectionalized at any point or points throughout its length, the adjacent ends of the sections being provided with interlocking driving dogs $7^x$ for rotating the sections in unison. The dogs $7^x$ may be disposed opposite a slot $7^a$, $7^b$, $7^c$ or $7^d$ or may be located in a solid section, hence the total valve length may be broken up into as many parts as desired.

My novel valve may be used to supply a plurality of cylinders operating from a common crankshaft with fuel, and to remove the burnt gases by using an extended form of the valve along the cylinders parallel to the crankshaft; also one valve may control the intake and exhaust of two rows of cylinders operating from two crankshafts geared together by placing the valve between the two rows.

Figure 2:
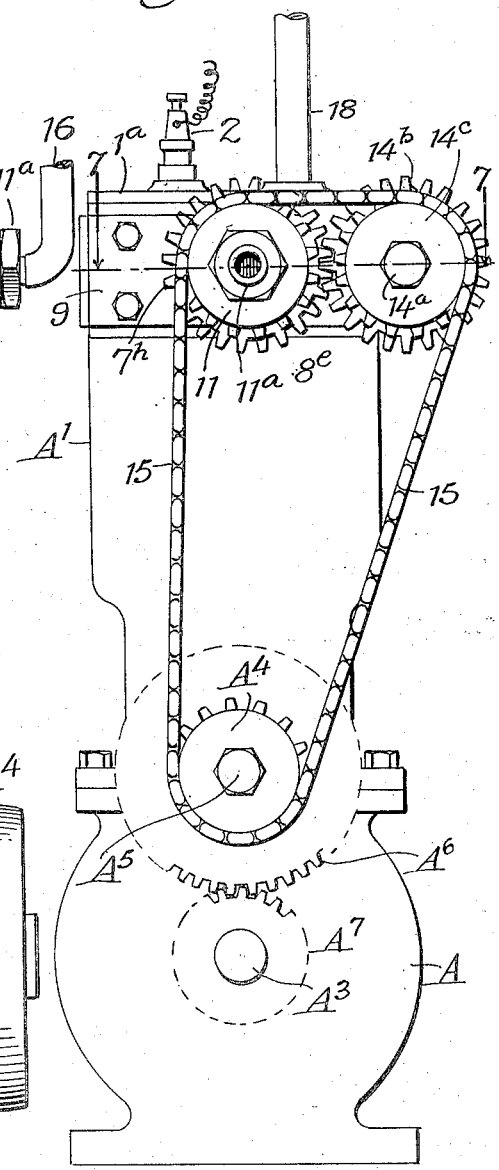
Fig. 2 is an end elevation thereof showing the mechanism for driving the inner and outer rotating sleeves of the valve in opposite directions but at the same speeds.

In Figs. 12 and 13 my novel rotary valve is illustrated in connection with a multiple unit engine, four cylinders $A'$ being shown, in which pistons $A^2$ reciprocate, said pistons being operated from a crankshaft $A^3$ in the usual manner. The valve casing 100 forms the heads of the cylinders and is removably bolted thereto as shown in Fig. 13. Extending through the casing 100 is a tubular portion 101 adapted to house the valve sleeves hereinafter referred to. Opposite each cylinder $A'$, in the lower face of the casing 100 is a firing chamber 102 communicating with the tubular portion 101, and spark plugs 103 extend into chamber 102. Inlet ports 104 extend from the side of casing 100 and communicate with the tubular portion 101, said ports 104 being preferably disposed intermediate adjacent cylinders so that one port will feed two cylinders with fuel vapors supplied by the manifold 105 from a suitable carburetor (not shown), making possible a shorter engine than if each cylinder were provided with a separate intake port 104. The same arrangement may be used for the exhaust ports 106, except the exhaust ports 106 for the end cylinders which can take care of but one cylinder each. An exhaust manifold 107 connects the three exhaust ports 106, with a suitable muffler (not shown) or discharges into the atmosphere. Within the tubular portion 101 is a sleeve 108 extending the full length thereof said sleeve being provided with longitudinal slots 109 therein opposite each of the intake ports 104, exhaust ports 106, and firing chamber ports 102, the slots 109 being of suitable size and suitably located. The hollow inner sleeve 110 is rotatably mounted within the sleeve 108 and is provided with suitably sized and located intake recesses 111 and exhaust recesses 112, the recesses being similar in shape to the recesses $8^a$ and $8^b$ of Figs. 3, 10 and 11. The sleeves 108 and 110 are adapted to rotate in opposite directions at half engine crank shaft speed to establish communication between the intake ports and the firing chambers, and between the exhaust ports and the firing chambers of the several units on proper sequence, in a manner similar to the valve operation of the engine shown in Figs. 1 to 11 inclusive. A stub-shaft 113 is driven at half engine speed by means of a chain 114 running over suitably sized sprockets 115 and 116 on the crank shaft $A^3$ and stub-shaft 113 respectively.

A chain 117 runs over sprockets 118 and 119 of same size, on the stub-shaft 113 and on an extension of the outer sleeve 108 respectively, and intermeshing gears 120, 121 of same size on the stub-shaft 113 and the inner sleeve 110 drives the inner sleeve 110 at the same speed as the outer sleeve 108 but in the opposite direction. Suitable stuffing boxes 122 and 123 around extensions of the inner sleeve 110 permit cooling water to circulate through the inner sleeve 110, the method of cooling the valve being the same as that described in connection with the engine shown in Figs. 1 to 11 inclusive.

I do not limit my invention to the exact form shown in the drawings for obviously changes may be made therein within the scope of the claims.

I claim:

1. In an internal combustion engine, a rotary valve comprising a tubular casing having a port communicating with the engine cylinder, and having an intake port and an exhaust port; a rotary sleeve in said tubular portion, having intake slots adapted to register with the intake port and with the cylinder port respectively, and having exhaust slots adapted to register with the exhaust port and with the cylinder port respectively; an inner sleeve rotatably mounted in said outer sleeve, and having recesses therein adapted to embrace the intake slots and the exhaust slots respectively; said recesses being arcuate in longitudinal cross section, and progressively changing from a sector of a circle to an arc of a circle in transverse cross-section from the mid points to each end of the recsses.

2. In an internal combustion engine, a rotary valve comprising a tubular casing having a port communicating with the engine cylinder, and having an intake port and an exhaust port; a rotary sleeve in said tubular portion having a pair of intake slots adapted to register with the intake port and with the cylinder port respectively, and having a pair of exhaust slots therein adapted to register with the exhaust port and with the cylinder port respectively; and an inner sleeve rotatably mounted within said outer sleeve, and having recesses therein adapted to embrace the intake slots and the exhaust slots respectively; said recesses being arcuate in longitudinal cross section, and progressively changing from a sector of a circle to an arc of a circle in transverse cross section from the mid point of the recesses to each end.

3. In an internal combustion engine, a rotary valve comprising a tubular casing having a port communicating with the engine cylinder, and having an intake port and an exhaust port; a rotary sleeve in said tubular portion having a pair of intake slots adapted to register with the intake port and with the cylinder port respectively, and having a pair of exhaust slots therein adapted to register with the exhaust port and with the cylinder port respectively; an inner sleeve rotatably mounted within said first mentioned sleeve, and having recesses therein adapted to embrace the intake slots and the exhaust slots respectively; said recesses being arcuate in longitudinal cross section, and progressively changing from a sector of a circle to an arc of a circle in transverse cross-section from the mid points of the recesses to each end; and means for rotating the sleeves in opposite directions.

4. In an internal combustion engine, a valve casing; a tubular portion within the casing; a firing chamber in said casing communicating with the tubular portion; an intake port for the tubular portion; an exhaust port for the tubular portion; a rotary sleeve in said tubular portion having a pair of aligned intake slots therein disposed opposite the intake port and firing chamber respectively; and having a pair of aligned exhaust slots therein disposed opposite the exhaust port and firing chamber port respectively; and a second sleeve rotatable within the first sleeve, and having longitudinally disposed recesses therein adapted to embrace the pairs of intake slots and the pairs of exhaust slots respectively as the sleeves are rotated.

5. In an internal combustion engine, a valve casing; a tubular portion extending longitudinally within the casing; a firing chamber in said casing having a port communicating with the tubular portion; an intake port for the tubular portion; an exhaust port for the tubular portion; a rotary sleeve in said tubular portion having a pair of circumferentially disposed aligned intake slots therein disposed opposite the intake port and firing chamber port respectively and having a pair of circumferentially disposed aligned exhaust slots therein disposed opposite the exhaust port and firing chamber port respectively; a second sleeve rotatable within the first sleeve, and having longitudinally disposed recesses therein adapted to embrace the pairs of intake slots and the pairs of exhaust slots respectively as the sleeves are rotated; and means for rotating the sleeves.

6. In an internal combustion engine, a valve casing; a tubular portion extending longitudinally within the casing; a firing chamber in said casing and having a port communicating with the tubular portion adjacent its mid point; an intake port communicating with the tubular portion adjacent one end of the casing; an exhaust port communicating with the tubular portion adjacent the opposite end of the casing; said intake and exhaust ports being disposed on the same side of the tubular portion as the firing chamber; a rotary sleeve in said tubular portion having a pair of circumferentially disposed aligned intake slots therein disposed opposite the intake port and firing chamber port respectively, and having a pair of circumferentially disposed aligned exhaust slots therein disposed opposite the exhaust port and firing chamber port respectively; a second sleeve rotatable within the first sleeve and having longitudinally disposed recesses therein adapted to embrace the pairs of intake slots and the pairs of exhaust slots respectively as the sleeves are rotated; and means for rotating the sleeves in opposite directions.

7. In an internal combustion engine a tubular valve casing having a port communicating with the engine cylinder; and a pair of rotary sleeve valves in said tubular portion rotating one within the other, the outer sleeve having a series of perforations therein adapted to register with the firing chamber port during the compression stroke; whereby on the compression stroke films of oil will be forced through said perforations to lubricate the inner sleeve from the outer sleeve.

8. In an internal combustion engine, a casing adapted to form the engine cylinder head; a tubular portion within the casing having a port communicating with the engine cylinder; a pair of rotary sleeves in said tubular portion rotating one within the other, the outer sleeve having a series of perforations therein adapted to register with the firing chamber port during the compression stroke; and means for depositing a film of oil around the outer sleeve, whereby on the compression stroke films of oil will be forced through said perforations to lubricate the inner sleeve from the outer sleeve.

9. In an internal combustion engine a valve casing adapted to form the engine cylinder head; a tubular portion extending longitudinally within the casing; and having a port communicating with the engine cylinder; a pair of rotary sleeves in said tubular portion rotating one within the other, the outer sleeve having a series of perforations therein adapted to register with the firing chamber port during the compression stroke; and means for feeding lubricating oil between the outer sleeve and the tubular portion to deposit a film of oil around the outer sleeve, whereby on the compression stroke films of oil will be forced through said series of perforations to lubricate the inner sleeve from the outer sleeve.

10. In an internal combustion engine a valve casing adapted to form the engine cylinder head; a tubular portion extending longitudinally within the casing; a firing chamber in said casing and having a port communicating with the tubular portion; said tubular portion having longitudinally disposed oil grooves in its inner walls; a pair of rotary sleeves in said tubular portion rotating one within the other; the outer sleeve having a series of perforations therein adapted to register with the firing chamber port during the compression stroke, and having oil grooves longitudinally disposed therein; and means for feeding lubricating oil between the outer sleeve and the tubular portion to deposit a film of oil around the outer sleeve, whereby during the compression stroke films of oil will be forced through said perforations to lubricate the inner sleeve from the outer sleeve.

11. In an internal combustion engine, a cylinder head casing having a longitudinal bore, and having a firing chamber having a port communicating with the bore; said bore having an intake port, and an exhaust port; said intake port and exhaust port and firing chamber port being disposed in longitudinal alignment; and a pair of rotary valve sleeves in said bore, one sleeve within the other, and rotating in opposite directions; the outer sleeve having a pair of aligned intake slots therein disposed opposite the intake port and firing chamber respectively, and having a pair of aligned exhaust slots therein disposed opposite the exhaust port and firing chamber respectively; and the inner sleeve having longitudinally disposed recesses in its surface adapted to embrace the respective pairs of slots in the outer sleeve as the sleeves rotate.

12. In an internal combustion engine, a cylinder head casing having a longitudinal bore and having a firing chamber having a port communicating with the bore and clyinder; said bore having an intake port and an exhaust port; said intake port and exhaust port being in longitudinal alignment with the firing chamber port; a rotary sleeve in said bore having a pair of aligned intake slots therein disposed opposite the intake port and firing chamber respectively, and having a pair of aligned exhaust slots therein disposed opposite the exhaust port and firing chamber respectively; a second sleeve rotatable within the first sleeve and having longitudinally disposed recesses in its surface embracing each pair of slots; and means for rotating the sleeves in opposite directions.

13. In an internal combustion engine, a cylinder head casing having a longitudinal bore and having a firing chamber having a port communicating with the bore and cylinder; said bore having an intake port and an exhaust port; said intake port and exhaust port and firing chamber port being disposed on the same side of the bore and being in longitudinal alignment; a rotary sleeve in said bore having a pair of aligned intake slots therein disposed opposite the intake port and firing chamber respectively, and having a pair of aligned exhaust slots therein disposed opposite the exhaust port and firing chamber respectively; a second sleeve rotatable within the first sleeve and having longitudinally disposed recesses in its surface adapted to embrace the pair of intake slots and the pair of exhaust slots respectively as the sleeves are rotated; and means for rotating the sleeves in opposite directions.

14. In an internal combustion engine, a cylinder head casing having a longitudinal bore and having a firing chamber disposed to one side of the bore communicating with the cylinder, the chamber having a port communicating with the bore adjacent its mid point; said bore having an intake port adjacent one end of the casing and having an exhaust port adjacent the opposite end of the casing; said intake port and exhaust port and firing chamber port being disposed on the same side of the bore and in longitudinal alignment; a rotary sleeve in said bore having a pair of aligned intake slots therein opposite the intake port and firing chamber port respectively, and having a pair of aligned exhaust slots therein opposite the exhaust port and firing chamber port respectively; a second sleeve rotatable within the first sleeve and having longitudinally disposed recesses in its surface adapted to embrace the pair of intake slots and the pair of exhaust slots respectively as the sleeves are rotated; and means for rotating the sleeves in opposite directions.

15. For an internal combustion engine, a valve casing having a firing chamber, an intake port, and exhaust port; a rotatable sleeve extending through the casing and having a pair of intake slots disposed opposite the intake port and firing chamber respectively, and having a pair of exhaust slots opposite the exhaust port and firing chamber respectively; and a member rotatable within the sleeve and provided with recesses adapted to embrace the respective pairs of slots.

16. In combination with a valve casing as set forth in claim 15; means for depositing a film of oil around the first mentioned sleeve; said sleeve having a series of perforations therein opposite the firing chamber port whereby films of oil will be forced through the perforations to lubricate the inner rotatable member from said sleeve.

17. For multiple unit internal combustion engine, a valve casing having a plurality of firing chambers, one for each unit; said valve casing having a plurality of intake ports and exhaust ports, said intake ports being disposed intermediate adjacent cylinders and adapted to feed two adjacent cylinders; a rotatable sleeve extending through the casing and having pairs of intake slots disposed opposite the intake ports and firing chambers respectively, and having pairs of exhaust slots opposite the exhaust ports and firing chambers respectively; and a member rotatable within the sleeve and provided with recesses adapted to embrace the respective pairs of slots.

18. In combination with a valve casing as set forth in claim 17, means for depositing a film of oil around the first mentioned sleeve; said sleeve having a series of perforations therein opposite the firing chamber port whereby films of oil will be forced through the perforations to lubricate the inner rotatable member from said sleeve.

In testimony that I claim the foregoing as my own, I affix my signature.

LELAND ELMER LAWRENCE.